United States Patent
Yang

(10) Patent No.: US 8,674,221 B2
(45) Date of Patent: Mar. 18, 2014

(54) SWITCH STRUCTURE

(76) Inventor: Hsiu-Ling Yang, Tauyuan (TW)

( * ) Notice: Subject to any disclaimer, the term of this patent is extended or adjusted under 35 U.S.C. 154(b) by 253 days.

(21) Appl. No.: 13/323,720

(22) Filed: Dec. 12, 2011

(65) Prior Publication Data

US 2013/0148323 A1    Jun. 13, 2013

(51) Int. Cl.
*H02G 3/14* (2006.01)

(52) U.S. Cl.
USPC ............. 174/66; 174/67; 361/810; 200/315; 200/317; 200/313

(58) Field of Classification Search
CPC ......... H01H 9/181; H01H 9/182; H01H 9/16; H01H 9/161
USPC ........................................ 220/241
See application file for complete search history.

(56) References Cited

U.S. PATENT DOCUMENTS

| | | | | |
|---|---|---|---|---|
| 2,515,820 A | * | 7/1950 | Clark | 40/542 |
| 3,953,933 A | * | 5/1976 | Goldstein | 40/642.02 |
| 5,473,517 A | * | 12/1995 | Blackman | 362/95 |
| 5,675,125 A | * | 10/1997 | Hollinger | 174/66 |
| 6,883,927 B2 | * | 4/2005 | Cunningham et al. | 362/95 |
| 7,581,844 B1 | * | 9/2009 | Yang | 362/95 |
| 2001/0046130 A1 | * | 11/2001 | Cunningham et al. | 362/95 |
| 2002/0079208 A1 | * | 6/2002 | Campana et al. | 200/310 |
| 2007/0291469 A1 | * | 12/2007 | Chen | 362/95 |
| 2008/0135388 A1 | * | 6/2008 | Hoehne et al. | 200/312 |

* cited by examiner

*Primary Examiner* — Tuan T Dinh
*Assistant Examiner* — Steven T Sawyer
(74) *Attorney, Agent, or Firm* — Morris Manning & Martin LLP; Tim Tingkang Xia, Esq.

(57) ABSTRACT

A switch structure includes a cover plate unit having a holding case and a transparent cover movably connected to the holding case with a patterned section sandwiched between them; at least one switch coupled with the cover plate unit and having a switching key; a light emitting unit arranged in the holding case and electrically connected to the switch; and at least one press section including a push plate movably coupled with the cover plate unit and the switching key with a front side protruded from the cover plate unit, a transparent cover movably connected to the push plate, and a label located between the push plate and the transparent cover. The patterned section provides esthetic visual effect; the label indicates a position of which the lighting is controlled by the switch; and the light emitting unit works cooperatively with the switch to serve as an auxiliary light source.

2 Claims, 7 Drawing Sheets

A-A

B-B

SWITCH STRUCTURE

FIELD OF THE INVENTION

The present invention relates to a switch structure, and more particularly to a switch structure that includes a cover plate unit having a patterned section to provide esthetic visual effect, a press section having a label to indicate a position of which the lighting is controlled by the switch, and a light emitting unit working cooperatively with a switch to serve as an auxiliary light source, so that the switch structure is practical for use, has esthetic appearance, and achieves good use functionality.

BACKGROUND OF THE INVENTION

To increase the convenience in use thereof, a conventional switch structure is usually provided on a switching key thereof with a light emitting member, so that a user can easily locate and turn on the switch structure in a dark environment with the aid of the dim light emitted from the light emitting member on the switching key.

However, the dim light of the light emitting member on the switching key has low brightness and can only be used by the user to locate the switching key in the dark without the function of illumination. Therefore, an additional nightlight is still required in a room to serve as a lighting fixture in the night. Further, the conventional switching key usually has a smooth curved surface without any label or mark for indicating the position of which the lighting is controlled by the switching key. In the case there are multiple switching keys provided on one single cover plate of the switch structure, these switching keys without labels or marks tend to confuse the user and the user has to try all the switching keys one by one to locate the correct one. Therefore, the conventional switch structure is not practical for use. Moreover, the cover plate of the conventional switch structure is usually made of a plastic material without showing any other decorative configuration, giving the whole cover plate of the switch structure a monotonous appearance that fails to match other changeful interior decoration and design.

It is therefore tried by the inventor to develop an improved switch structure that is more attractive in appearance and more practical for use, and achieves good use functionality.

SUMMARY OF THE INVENTION

A primary object of the present invention is to provide an improved switch structure, which is practical for use, has esthetic appearance, and achieves good use functionality by including a cover plate unit having a patterned section to provide esthetic visual effect, a press section having a label to indicate a position of which the lighting is controlled by the switch, and a light emitting unit working cooperatively with a switch to serve as an auxiliary light source.

To achieve the above and other objects, the switch structure according to a first embodiment of the present invention includes a cover plate unit having a holding case, a transparent cover movably connected to the holding case, and a patterned section provided between the holding case and the transparent cover; at least one switch coupled with the cover plate unit and having a switching key provided on a front side thereof; a light emitting unit arranged in the holding case and electrically connected to the switch; and at least one press section movably connected to the cover plate unit with a front side protruded from the transparent cover of the cover plate unit. The press section includes a push plate movably coupled with the holding case and the switching key, and a transparent cover movably connected to the push plate.

In the first embodiment, the holding case, the patterned section, and the transparent cover of the cover plate unit are respectively and correspondingly provided with an opening for receiving the switch and the press section therein; the holding case is provided on an end surface with a long slot, via which the light emitting unit is shown; and the patterned section of the cover plate unit can be any one of a plastic film, a paper sheet and a sticker that have patterns printed thereon; and the switch is coupled with the holding case via a mounting bracket. Further, according to the first embodiment, the light emitting unit includes a light emitting member configured corresponding to the long slot, a transformer arranged in the holding case and connected to the light emitting member and the switch, and a sensor connected to the transformer and located at one side of the transparent cover of the cover plate unit; and the press section also includes a label provided between the push plate and the transparent cover of the press section, and the label can be any one of a plastic film, a paper sheet and a sticker that have characters printed thereon.

To achieve the above and other objects, the switch structure according to a second embodiment of the present invention includes a cover plate unit having a holding case, a transparent cover movably connected to the holding case, and a patterned section provided between the holding case and the transparent cover; at least one switch coupled with the cover plate unit and having a switching key provided on a front side thereof; and at least one press section movably connected to the cover plate unit with a front side protruded from the transparent cover of the cover plate unit. The press section includes a push plate movably coupled with the holding case and the switching key, and a transparent cover movably connected to the push plate.

In the second embodiment, the holding case, the patterned section, and the transparent cover of the cover plate unit are respectively and correspondingly provided with an opening for receiving the switch and the press section therein; the patterned section of the cover plate unit can be any one of a plastic film, a paper sheet and a sticker that have patterns printed thereon; the switch is coupled with the holding case via a mounting bracket; and the press section further includes a label provided between the push plate and the transparent cover of the press section, and the label can be any one of a plastic film, a paper sheet and a sticker that have characters printed thereon.

In the present invention, the patterned section of the cover plate unit provides esthetic visual effect, the label of the press section indicates a position of which the lighting is controlled by the switch, and the light emitting unit works cooperatively with the switch to serve as an auxiliary light source, enabling the switch structure to be more attractive in appearance and more practical for use while achieves good use functionality.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
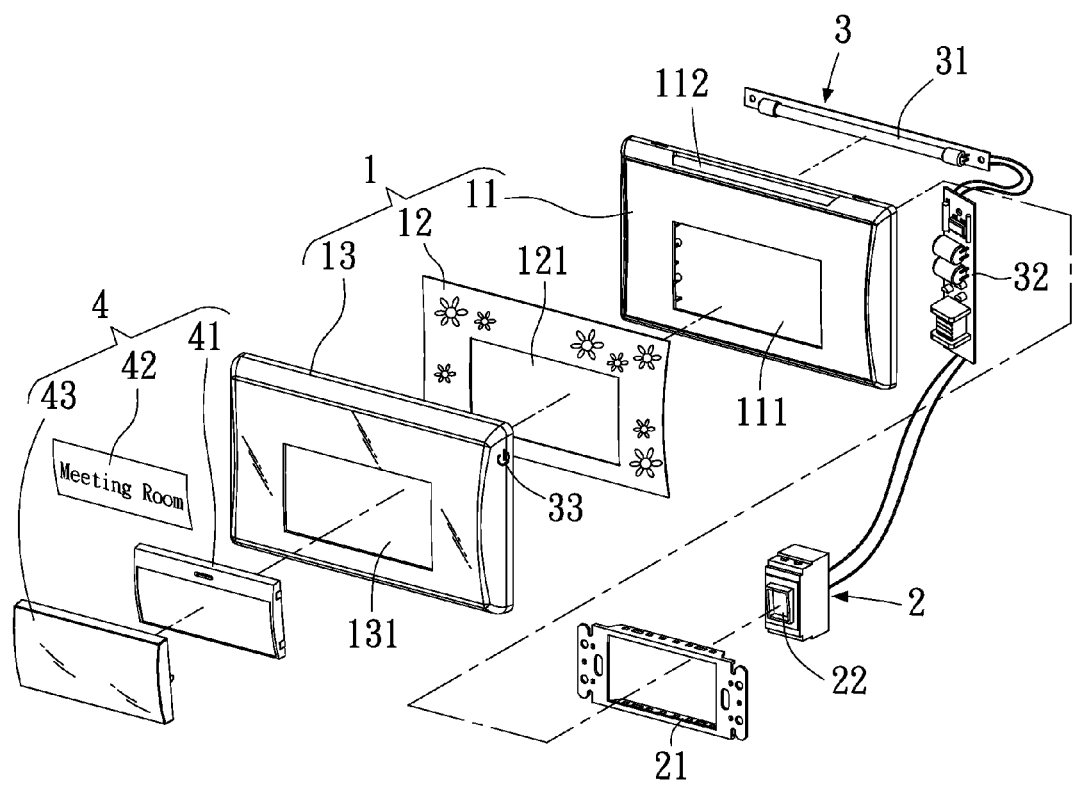
FIG. 1 is an exploded perspective view of a switch structure according to a first embodiment of the present invention.

The present invention will now be described with some preferred embodiments thereof and with reference to the accompanying drawings. For the purpose of easy to understand, elements that are the same in the preferred embodiments are denoted by the same reference numerals.

Figure 2:
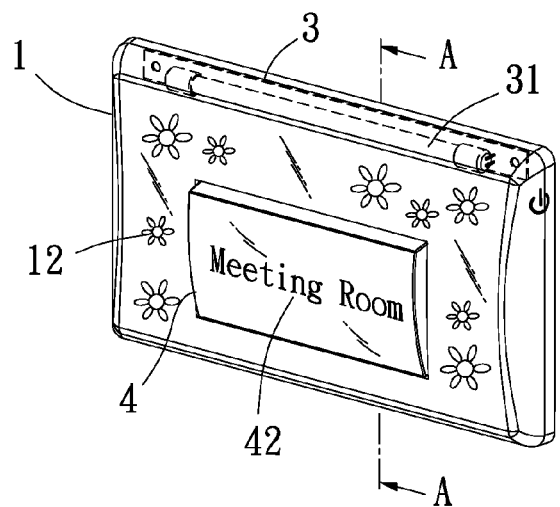
FIG. 2 is an assembled view of FIG. 1.
Figure 3:
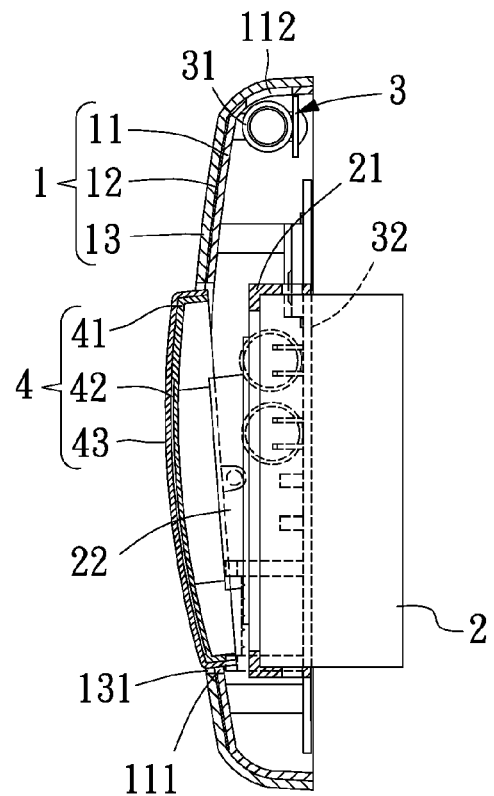
FIG. 3 is a sectional view taken along line A-A of FIG. 2.

Please refer to FIGS. 1 and 2 that are exploded and assembled perspective views, respectively, of a switch structure according to a first embodiment of the present invention, and to FIG. 3 that is a sectional view taken along line A-A of FIG. 2. As shown, the switch structure in the first embodiment includes a cover plate unit 1, at least one switch 2, a light emitting unit 3, and at least one press section 4.

The cover plate unit 1 includes a holding case 11, a patterned section 12 attached to a front surface of the holding case 11, and a transparent cover 13 movably coupled with the front surface of the holding case 11 to locate in front of the patterned section 12. The holding case 11, the patterned section 12 and the transparent cover 13 are correspondingly provided with an opening 111, 121 and 131, respectively. The holding case 11 is provided on an end surface with a long slot 112. The patterned section 12 may be a plastic film, a paper sheet, or a sticker having patterns printed thereon.

The switch 2 is coupled with the holding case 11 of the cover plate unit 1 via a mounting bracket 21, and is located behind the holding case 11 corresponding to the openings 111, 121, 131. On a front side of the switch 2, there is provided a switching key 22.

The light emitting unit 3 is arranged in the holding case 11 of the cover plate unit 1 to electrically connect to the switch 2. The light emitting unit 3 includes a light emitting member 31 configured corresponding to the long slot 112, a transformer 32 arranged in the holding case 11 and connected to the light emitting member 31 and the switch 2, and a sensor 33 connected to the transformer 32 and located at one side of the transparent cover 13.

The press section 4 is movably connected to the cover plate unit 1, and has a front side protruded from the transparent cover 13. The press section 4 includes a push plate 41 movably coupled with the holding case 11 and the switching key 21, a label 42 attached to a front side of the push plate 41, and a transparent cover 43 movably connected to the push plate 41. The label 42 may be a plastic film, a paper sheet, or a sticker having characters printed thereon.

To use the switch structure of the present invention, the switch 2 is electrically connected to a grid power source (not shown). By pushing the press section 4 against the cover plate unit 1, the switching key 22 of the switch 2 is pressed to control the on/off of a lighting fixture electrically connected to the switch structure. The transformer 32 of the light emitting unit 3 converts the alternating current (AC) of the grid power source into direct current (DC), which is supplied to the light emitting member 31 and the sensor 33 for use. The patterned section 12 of the cover plate unit 1 is used to provide an esthetic visual effect and the label 42 of the press section 4 is used to indicate a position of which the lighting is controlled by the switch 2. For example, the position shown on the label 42 may be "meeting room", "study", "parlor", "bathroom" or the like. The transparent covers 13, 43 can be removed from the holding case 11 and the push plate 41, respectively, for the purpose of changing the patterned section 12 and the label 42. The light emitting unit 3 works cooperatively with the switch 2 to serve as an auxiliary light source. In practical operation of the switch structure, when the switch 2 is in an ON position, the sensor 33 controls the light emitting member 31 not to emit light. On the other hand, when the switch 2 is in an OFF position, the sensor 33 drives the light emitting member 31 to emit light and serve as a nightlight. And, the sensor 33 enters into an operating state in a dark room. The sensor 33 in the operating state can drive the light emitting member 31 to emit light when a user approaches the switch structure. The light emitted from the light emitting member 31 helps the user to correctly push the press section 4 for turning on the switch 2. On the other hand, the sensor 33 does not operate in a light room, and the user can operate the switch 2 directly. With these arrangements, the switch structure of the present invention is practical for use, provides esthetic visual effect, and achieves good use functionality.

Figure 4:
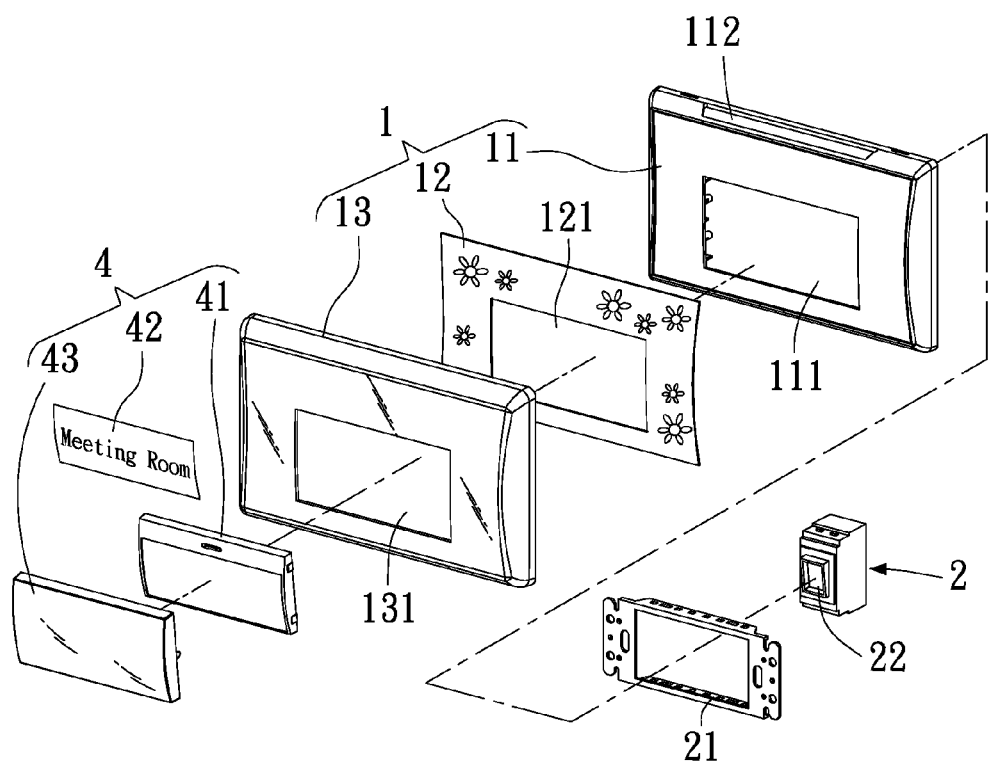
FIG. 4 is an exploded perspective view of a switch structure according to a second embodiment of the present invention.
Figure 5:
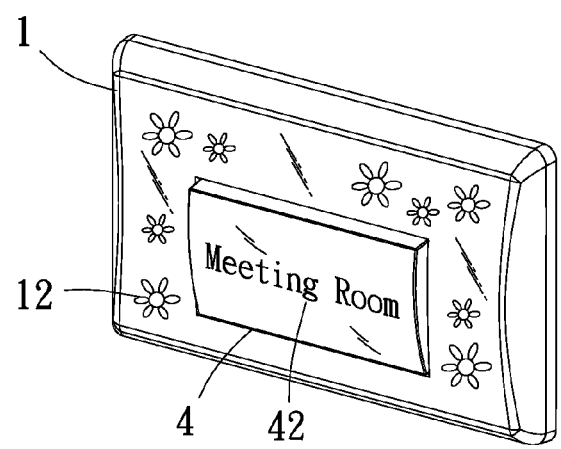
FIG. 5 is an assembled view of FIG. 4.

Please refer to FIGS. 4 and 5 that are exploded and assembled perspective views, respectively, of a switch structure according to a second embodiment of the present invention. As shown, the second embodiment is generally structurally similar to the first embodiment, except that the light emitting unit 3 and the long slot 112 provided on an end surface of the holding case 11 are omitted from the second embodiment. In using the switch structure according to the second embodiment of the present invention, the patterned section 12 of the cover plate unit 1 serves to provide an esthetic visual effect and the label 42 of the press section 4 serves to indicate a position of which the lighting is controlled by the switch 2. For example, the position shown on the label 42 may be "meeting room", "study", "parlor", "bathroom" or the like. And, the transparent covers 13, 43 can be removed from the holding case 11 and the push plate 41, respectively, for the purpose of changing the patterned section 12 and the label 42.

Figure 6:
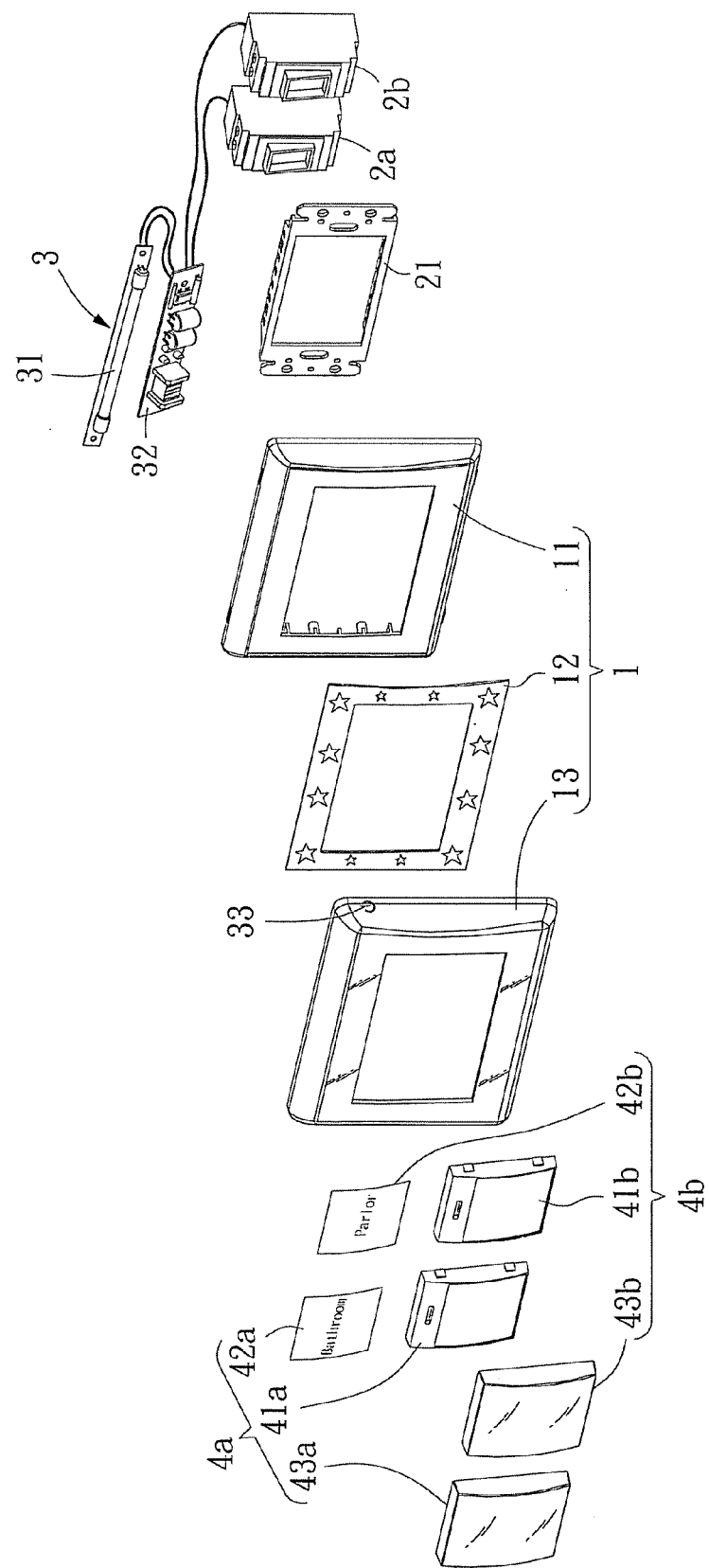
FIG. 6 is an exploded perspective view of a switch structure according to a third embodiment of the present invention.
Figure 7:
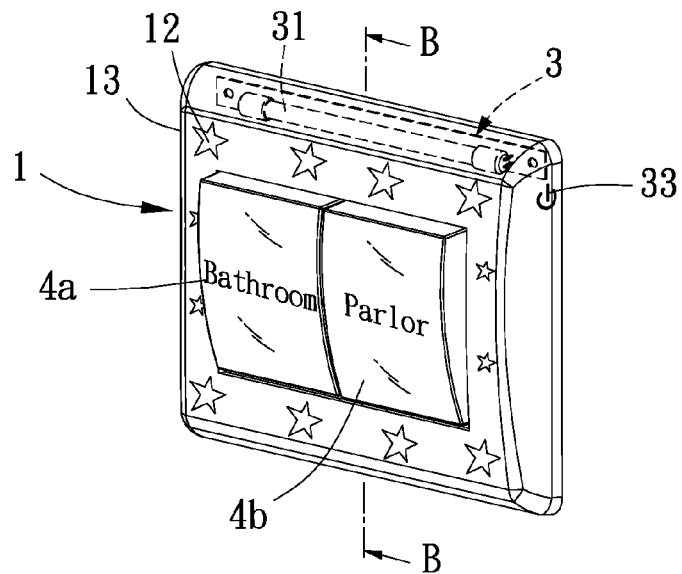
FIG. 7 is an assembled view of FIG. 6.
Figure 8:
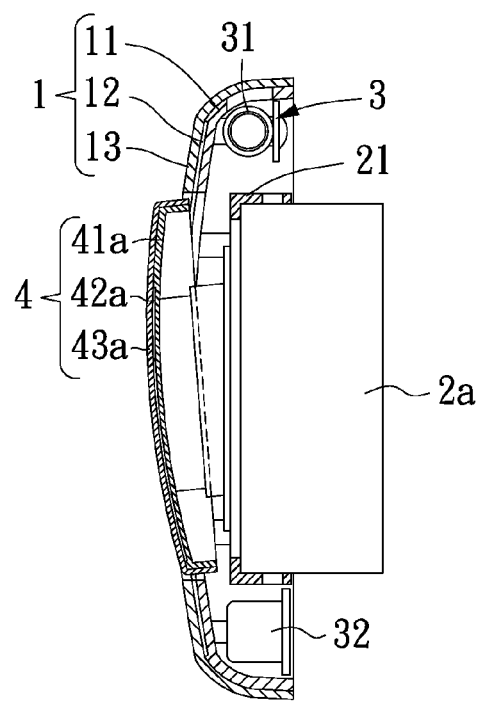
FIG. 8 is a sectional view taken along line B-B of FIG. 7.

Please refer to FIGS. 6 and 7 that are exploded and assembled perspective views, respectively, of a switch structure according to a third embodiment of the present invention, and to FIG. 8 that is a sectional view taken along line B-B of FIG. 7. As shown, the third embodiment is generally structurally similar to the first and the second embodiment, except that two switches 2a, 2b and two press sections 4a, 4b are provided. The switches 2a, 2b are coupled with the holding case 11 of the cover plate unit 1, and are connected to the transformer 32 of the light emitting unit 3. Moreover, the switches 2a, 2b have a front side coupled with push plates 41a, 41b of the press sections 4a, 4b, respectively.

In using the switch structure of the third embodiment, the transparent covers 13, 43a, 43b can be removed from the holding case 11 and the push plates 41a, 41b for the purpose of replacing the patterned section 12 and labels 42a, 42b with other ones. The light emitting member 31 works cooperatively with the transformer 32 and the sensor 33 to serve as an auxiliary light source, just like in the first embodiment. Therefore, the switch structure of the third embodiment according to the present invention is also practical for use, provides esthetic visual effect, and achieves good use functionality.

Figure 9:
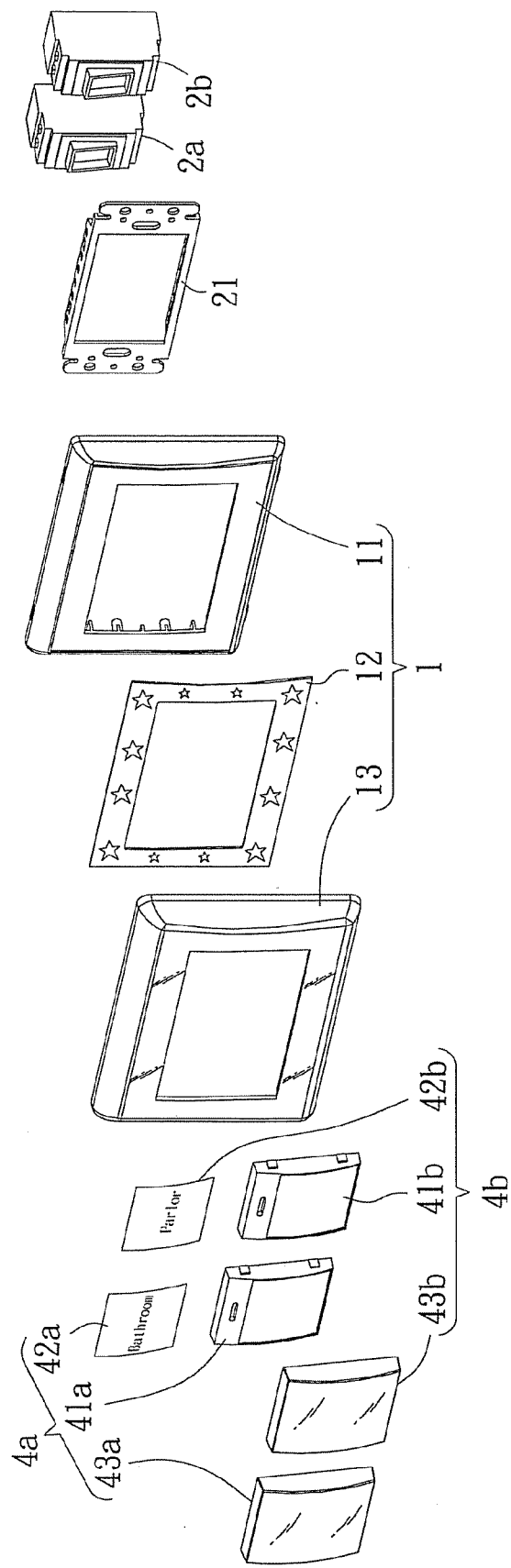
FIG. 9 is an exploded perspective view of a switch structure according to a fourth embodiment of the present invention.
Figure 10:
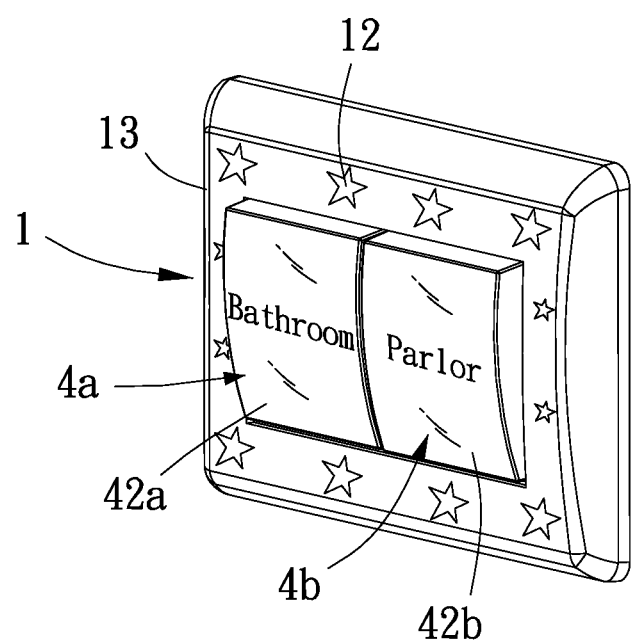
FIG. 10 is an assembled view of FIG. 9.

FIGS. 9 and 10 are exploded and assembled perspective views, respectively, of a switch structure according to a fourth embodiment of the present invention. As shown, the fourth embodiment is generally structurally similar to the first, the second and the third embodiment, except that the light emitting unit 3 and the long slot 112 provided on an end surface of the holding case 11 are omitted from the fourth embodiment while two switches 2a, 2b and two press sections 4a, 4b are provided. In using the switch structure according to the fourth embodiment of the present invention, the patterned section 12 of the cover plate unit 1 serves to provide an esthetic visual effect and labels 42a, 42b of the press sections 4a, 4b serve to indicate two different positions of which the lighting is controlled by the switches 2a, 2b. For example, the position shown on the label 42 may be "meeting room", "study", "parlor", "bathroom" or the like. And, the transparent covers 13, 43a, 43b can be removed from the holding case 11 and the push plates 41a, 41b, respectively, for the purpose of changing the patterned section 12 and the labels 42a, 42b.

With the above arrangements, the switch structure according to the present invention is novel, improved and industrially valuable. The switch structure is novel and improved because the patterned section of the cover plate unit provides esthetic visual effect, the label of the press section indicates a position of which the lighting is controlled by the switch, and the cooperative operation of the switch and the light emitting unit enables the provision of an auxiliary light source, enabling the switch structure to be more attractive in appearance and more practical for use, and achieve good use functionality. The switch structure of the present invention is industrially valuable because products derived from the present invention would no doubt fulfill the current market demands.

The present invention has been described with some preferred embodiments thereof and it is understood that many changes and modifications in the described embodiments can be carried out without departing from the scope and the spirit of the invention that is intended to be limited only by the appended claims.

What is claimed is:

1. A switch structure, comprising:
   a cover plate unit including a holding case, a patterned section attached to a front surface of the holding case, and a transparent cover movably coupled with the front surface of the holding case to locate in front of the patterned section;
   at least one switch being coupled with the cover plate unit and having a switching key provided on a front side thereof;
   a light emitting unit being arranged in the holding case of the cover plate unit to electrically connect to the switch; and
   at least one press section being movably connected to the cover plate unit and having a front side protruded from the transparent cover of the cover plate unit; the press section including a push plate movably coupled with the holding case and the switching key, and a transparent cover movably connected to the push plate,
   wherein the holding case is provided on an end surface with a long slot, via which the light emitting unit is shown, the light emitting unit includes a light emitting member configured corresponding to the long slot, a transformer arranged in the holding case and connected to the light emitting member and the switch, and a sensor connected to the transformer and located at one side of the transparent cover of the cover plate unit.

2. The switch structure as claimed in claim 1,
   wherein the holding case, the patterned section, and the transparent cover of the cover plate unit are respectively and correspondingly provided with an opening for receiving the switch and the press section therein;
   wherein the patterned section of the cover plate unit can be any one of a plastic film, a paper sheet and a sticker that have patterns printed thereon;
   wherein the switch is coupled with the holding case via a mounting bracket;
   wherein the press section further includes a label provided between the push plate and the transparent cover of the press section, and the label being any one of a plastic film, a paper sheet and a sticker that have characters printed thereon.

* * * * *